US012319102B2

(12) United States Patent
Wu

(10) Patent No.: US 12,319,102 B2
(45) Date of Patent: Jun. 3, 2025

(54) DUAL AIR VALVE CONNECTOR FOR SCHRADER AND PRESTA VALVES

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 0 days.

(21) Appl. No.: 18/397,064

(22) Filed: Dec. 27, 2023

(65) Prior Publication Data

US 2024/0360940 A1  Oct. 31, 2024

(30) Foreign Application Priority Data

Apr. 26, 2023  (TW) ................. 112115563

(51) Int. Cl.
*B60C 29/06* (2006.01)
*B60S 5/04* (2006.01)

(52) U.S. Cl.
CPC ............ *B60C 29/06* (2013.01); *B60S 5/043* (2013.01); *Y10T 137/3724* (2015.04)

(58) Field of Classification Search
CPC . B60C 29/06; B60S 5/043; B60S 5/04; Y10T 137/3584; Y10T 137/3724
See application file for complete search history.

(56) References Cited

U.S. PATENT DOCUMENTS

| | | | | |
|---|---|---|---|---|
| 5,638,865 A * | 6/1997 | Wu | ............... | F16K 11/0876 251/352 |
| 5,666,990 A * | 9/1997 | Wu | ............... | B60S 5/04 137/625.5 |
| 5,749,392 A * | 5/1998 | Glotin | ............... | F04B 33/005 285/12 |
| 5,819,781 A * | 10/1998 | Wu | ............... | B60S 5/04 137/231 |
| 5,921,269 A * | 7/1999 | Wu | ............... | B60S 5/04 137/231 |
| 5,960,815 A * | 10/1999 | Wang | ............... | F04B 33/005 137/119.06 |
| 5,975,109 A * | 11/1999 | Wu | ............... | B60S 5/04 137/231 |
| 6,102,063 A * | 8/2000 | Pierce | ............... | F16L 37/18 251/149.6 |
| 6,105,600 A * | 8/2000 | Wang | ............... | B60S 5/04 137/231 |
| 6,105,601 A * | 8/2000 | Wang | ............... | F16K 15/20 251/149.6 |

(Continued)

FOREIGN PATENT DOCUMENTS

CN  201007268 Y  *  1/2008
CN  203023014 U  *  6/2013

(Continued)

*Primary Examiner* — David Colon-Morales
(74) *Attorney, Agent, or Firm* — Muncy, Geissler, Olds & Lowe, P.C.

(57) ABSTRACT

An air valve connector includes a head and a switching assembly. The head has a first insertion hole, a second insertion hole, a communicating passage, and an inlet hole. The first insertion hole is provided with a first airtight portion disposed between the communicating passage and the inlet hole, and a second airtight portion disposed between the inlet hole and the first port. The switching assembly includes a plunger movably disposed in the first insertion hole to alternately abut against the first airtight portion or the second airtight portion.

7 Claims, 6 Drawing Sheets

(56) References Cited

U.S. PATENT DOCUMENTS

| | | | | |
|---|---|---|---|---|
| 6,146,116 A * | 11/2000 | Wu | ............... | F04B 33/005 137/231 |
| 6,220,273 B1 * | 4/2001 | Wu | ............... | F04B 33/005 137/231 |
| 6,843,270 B1 * | 1/2005 | Wang | ............... | F16K 31/52416 137/627 |
| 6,953,326 B2 * | 10/2005 | Wang | ............... | B60S 5/04 417/469 |
| 7,032,613 B2 * | 4/2006 | Delorme | ............... | F04B 33/005 137/231 |
| 7,562,671 B2 * | 7/2009 | Wang | ............... | F04B 33/005 251/149.2 |
| 8,156,955 B2 * | 4/2012 | Wang | ............... | F16K 15/20 137/231 |
| 8,360,090 B2 * | 1/2013 | Wang | ............... | F16K 11/056 137/119.06 |
| 8,402,987 B2 * | 3/2013 | Wang | ............... | B60S 5/043 251/149.1 |
| 8,720,474 B2 * | 5/2014 | Wang | ............... | F04B 33/00 137/231 |
| 8,720,475 B2 * | 5/2014 | Wu | ............... | F04B 33/005 137/271 |
| 8,839,809 B1 * | 9/2014 | Wang | ............... | F04B 33/005 137/231 |
| 8,869,819 B2 * | 10/2014 | Huang | ............... | B60S 5/04 285/308 |
| 9,016,304 B2 * | 4/2015 | Wang | ............... | F04B 33/005 137/223 |
| 9,206,916 B1 * | 12/2015 | Wang | ............... | F04B 33/00 |
| 9,249,914 B2 * | 2/2016 | Kuo | ............... | F16L 37/1215 |
| 9,297,464 B1 * | 3/2016 | Wang | ............... | F16K 15/20 |
| 9,388,914 B2 * | 7/2016 | Wang | ............... | F16K 11/04 |
| 9,675,981 B2 * | 6/2017 | Wang | ............... | B60S 5/04 |
| 10,203,059 B2 * | 2/2019 | Chuang | ............... | F16K 15/20 |
| 11,209,091 B2 * | 12/2021 | Wu | ............... | F16K 11/07 |
| 2009/0229677 A1 * | 9/2009 | Wang | ............... | F04B 33/005 137/231 |

FOREIGN PATENT DOCUMENTS

| | | | | |
|---|---|---|---|---|
| CN | 203130420 U | * | 8/2013 | ............... B60S 5/04 |
| CN | 207864710 U | * | 9/2018 | |
| CN | 115143082 A | * | 10/2022 | |
| DE | 102019135880 B3 | * | 5/2021 | |
| TW | 331374 U | | 5/1998 | |
| TW | 200734565 A | | 9/2007 | |
| TW | M343723 U | * | 11/2008 | |
| TW | M386404 U | | 8/2010 | |
| TW | 201317487 A | * | 5/2013 | ............ B60S 5/043 |
| TW | M482647 U | * | 7/2014 | |
| TW | M492987 U | | 1/2015 | |

* cited by examiner

DUAL AIR VALVE CONNECTOR FOR SCHRADER AND PRESTA VALVES

BACKGROUND OF THE INVENTION

The present invention relates to a dual air valve connector for Schrader and Presta valves.

U.S. Pat. No. 9,297,464 discloses an air valve connecting device, which includes a housing having an inlet mouth, a sliding member engaged in the housing and having an air pathway for receiving the pressurized air from the inlet mouth, a rotary member rotatably engaged with the housing and having two or more compartments each for receiving a gasket and an inflation valve, the rotary member is rotatable relative to the housing for selectively aligning either of the compartments of the rotary member with the chamber of the housing and the sliding member, and a hand grip includes a cam member attached to the housing with a pivot shaft and engaged with the sliding member for forcing the sliding member to force the gaskets to engage with the inflation valves respectively.

However, the air valve connecting device can selectively fit to U.S. type and French type inflation valves, but before attachment, it is necessary to rotate the rotary member to choose the compartment for engaging with the inflation valve, resulting in a complex operation.

The present invention has arisen to mitigate and/or obviate the afore-described disadvantages of the air valve connector.

SUMMARY OF THE INVENTION

An objective of the present invention is to provide a pump connector, which includes a head and a switching assembly. The head has a first insertion hole, a second insertion hole, a communicating passage, and an inlet hole. The communicating passage communicates with the first and second insertion holes. The inlet hole communicates with the first insertion hole. An end of the first insertion hole remote to the communicating passage is provided with a first port. An end of the second insertion hole remote to the communicating passage is provided with a second port. The first insertion hole is provided with a first airtight portion and a second airtight portion. The first airtight portion is disposed between the communicating passage and the inlet hole. The second airtight portion is disposed between the inlet hole and the first port. The switching assembly includes a plunger movably disposed in the first insertion hole to alternately abut against the first airtight portion or the second airtight portion between a first position and a second position. The plunger disengages from the second airtight portion and abuts against the first airtight portion to close an air path from the inlet hole to the communicating passage when the plunger is in the first position. The plunger disengages from the first airtight portion and abuts against the second airtight portion to close an air path from the inlet hole to the first port when the plunger is in the second position.

In an example, the head includes a housing, a sliding member, a first airtight ring, and a second airtight ring. The first port and the second port are located at the same end of the housing. The first insertion hole, the second insertion hole, and the communicating passage are arranged on the sliding member. The sliding member is movably disposed in the housing between a released position and a tightened position. The first airtight ring is disposed in the housing and located between the sliding member and the first port. The second airtight ring is disposed in the housing and located between the sliding member and the second port. The sliding member is away from the first port and the second port when the sliding member is in the released position. The sliding member approaches the first port and the second port to compress the first airtight ring and the second airtight ring to be deformed when the sliding member is in the tightened position.

In an example, the head further includes a pressing member. The first insertion hole is arranged on the sliding member and the pressing member. The first airtight portion is arranged on the sliding member. The second airtight portion is arranged on the pressing member. The pressing member has a first side is abutted against the sliding member and a second side abutting against the first airtight ring.

In an example, the head further includes a lever pivotally mounted on an end of the housing remote to the first port and the second port between an unlock position and a locked position to selectively push against the sliding member. The sliding member is moved to the released position when the lever is in the unlock position. The lever pushes the sliding member to move to the tightened position when the lever is in the lock position.

In an example, the head further includes a pin penetrably inserting the housing and the lever, allowing the lever rotatable relative to the housing about the pin.

In an example, the plunger includes a pushing rod, a first airtight member, and a second airtight member. The pushing rod is movably disposed in the first insertion hole along an axial direction of the first insertion hole. The first airtight member and the second airtight member are respectively sleeved on an outer periphery of the pushing rod. The first airtight member abuts against the first airtight portion and the second airtight member disengages from the second airtight portion when the plunger is in the first position. The first airtight member disengages from the first airtight portion and the second airtight member abuts against the second airtight portion when the plunger is in the second position.

In an example, the outer periphery of the pushing rod is provided with a first narrow section, a second narrow section, and a wide section. The first narrow section and the second narrow section are respectively disposed at opposite ends of the pushing rod, the wide section is disposed between the first narrow section and the second narrow section. A width of the first narrow section and a width of the second narrow section are both smaller than a width of the wide section in a radial direction of the first insertion hole. The first airtight member is sleeved on the first narrow section and abuts against the wide section. The second airtight member is sleeved on the second narrow section and abuts against the wide section.

In an example, the switching assembly further includes a biasing member disposed in the first insertion hole and located a side of the pushing rod remote the first port. The biasing member has a first end abutting against the sliding member and a second end abutting against the pushing rod to bias the plunger to the second position.

DETAILED DESCRIPTION OF THE INVENTION

Figure 1:
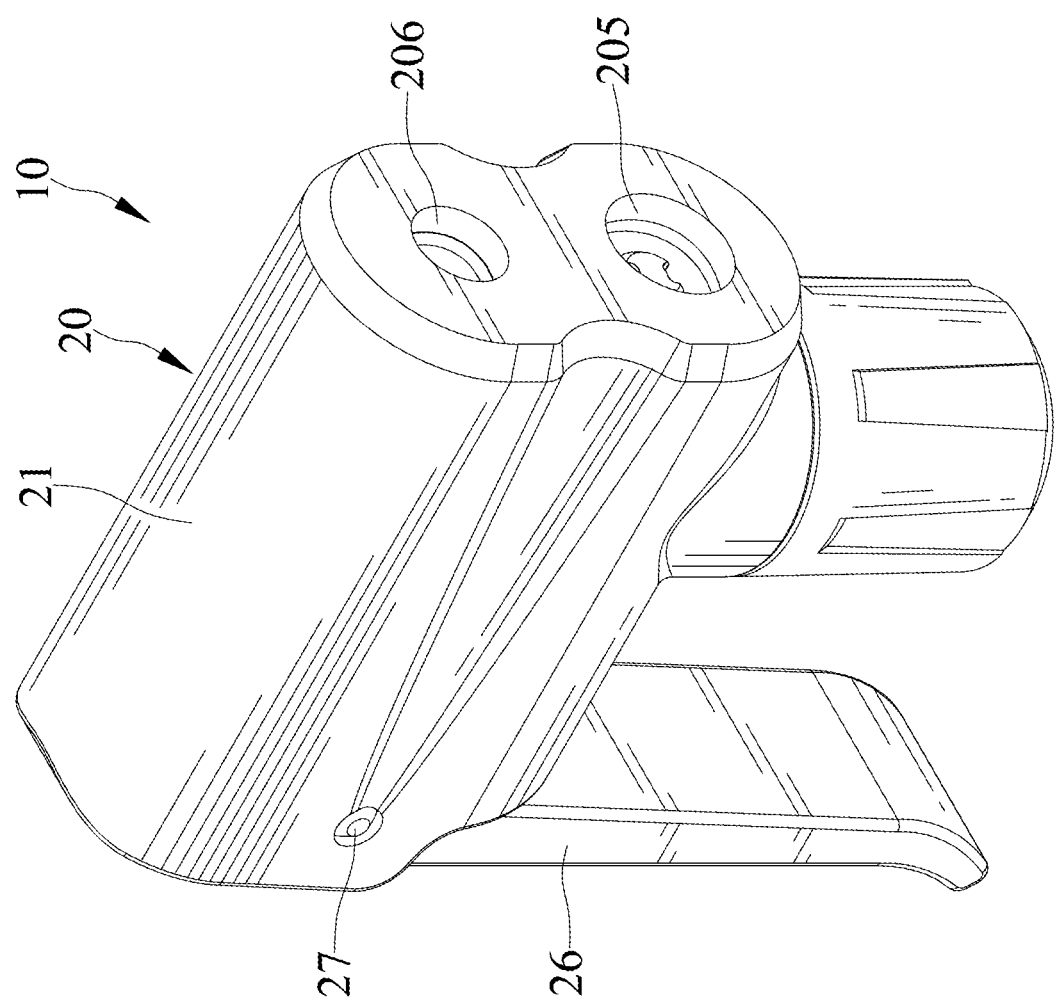
FIG. 1 is a perspective view of an air valve connector of an embodiment according to the present invention.
Figure 2:
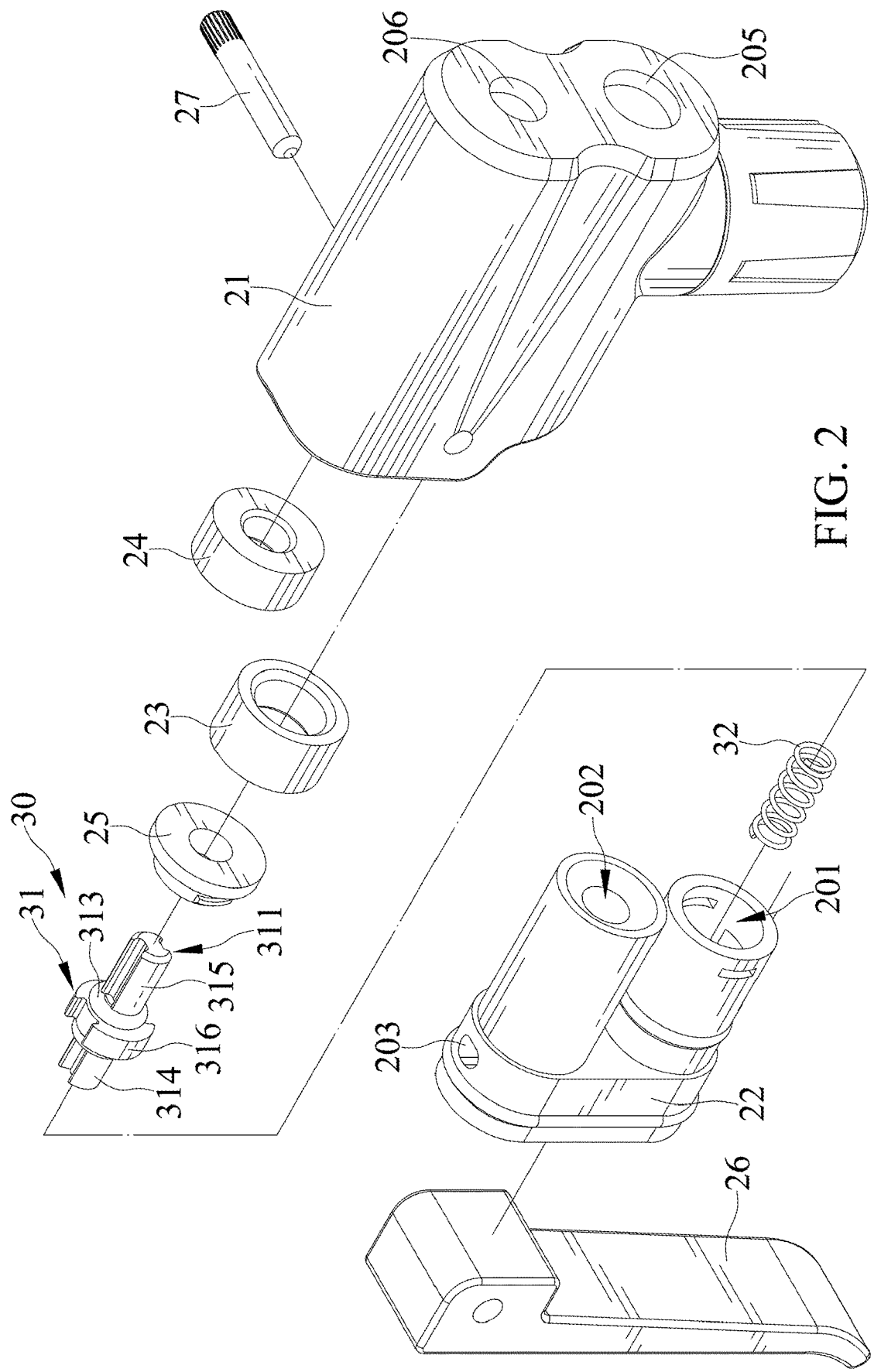
FIG. 2 is an exploded perspective view of the air valve connector of FIG. 1.
Figure 3:
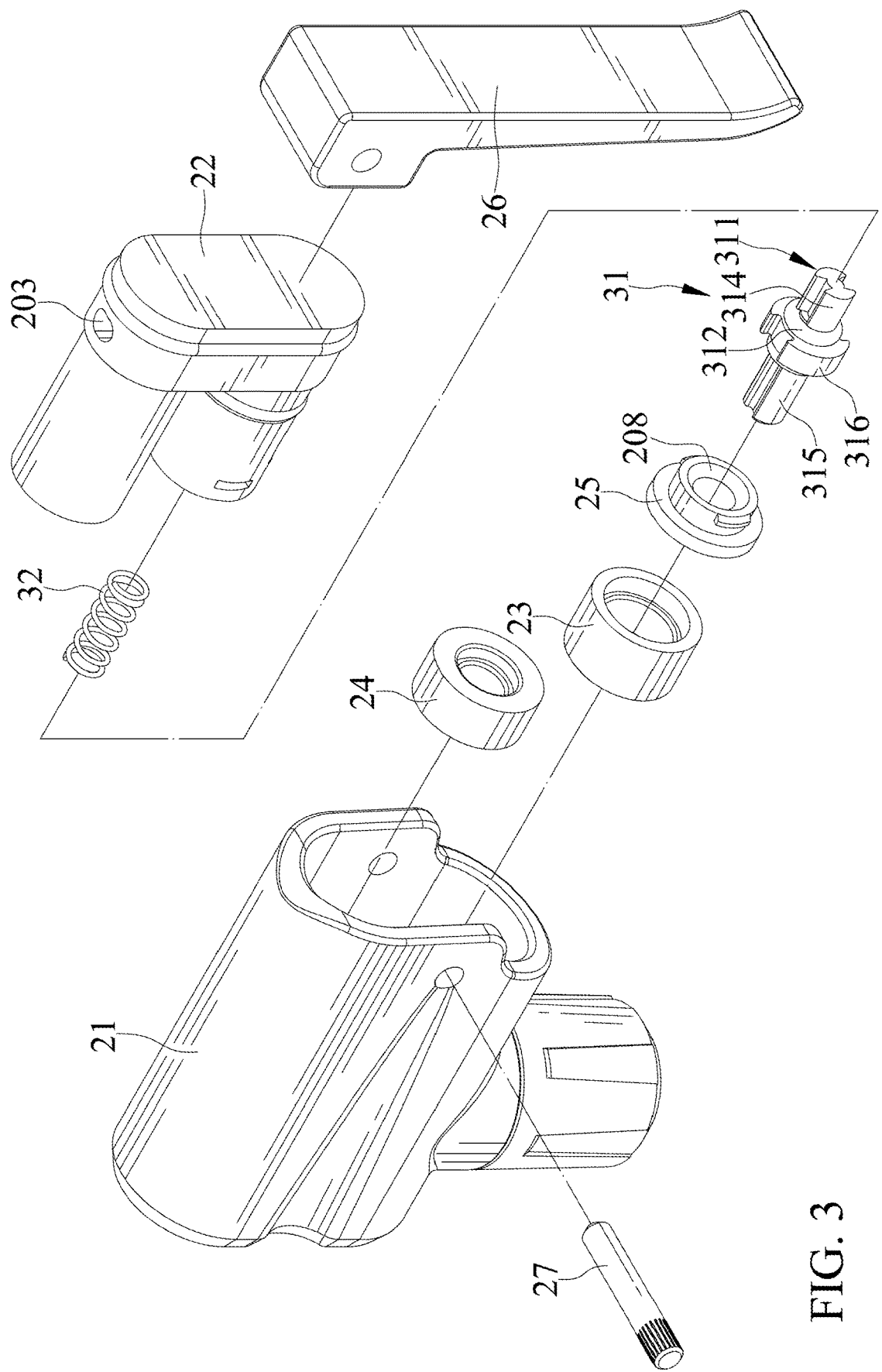
FIG. 3 is another exploded perspective view of the air valve connector of FIG. 1 from a different direction.
Figure 4:
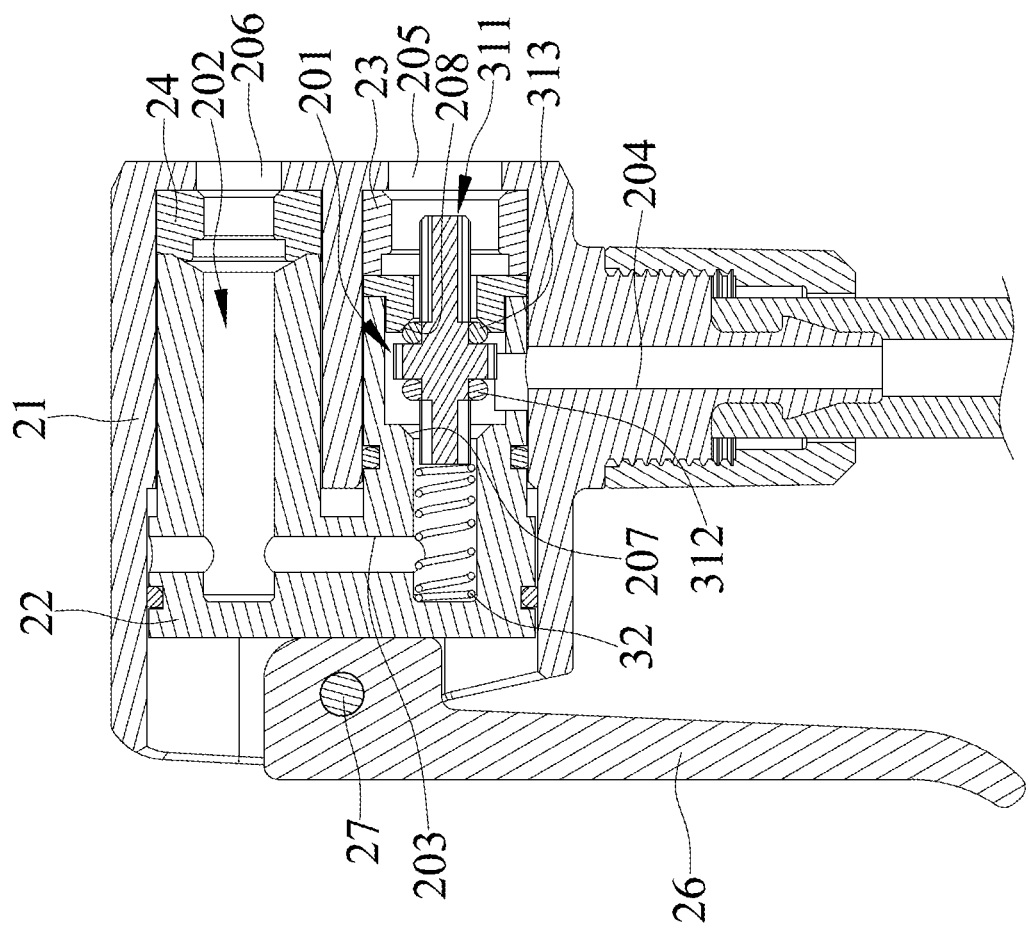
FIG. 4 is a cross sectional view of the air valve connector of FIG. 1 and shows the lever in an unlock position.

FIGS. 1-6 show an air valve connector 10 of an embodiment according to the present invention. The air valve connector 10 includes a head 20 and a switching assembly 30.

The head 20 has a first insertion hole 201, a second insertion hole 202, a communicating passage 203, and an inlet hole 204. The communicating passage 203 communicates with the first and second insertion holes 201 and 202. The inlet hole 204 communicates with the first insertion hole 201. An end of the first insertion hole 201 remote to the communicating passage 203 is provided with a first port 205. An end of the second insertion hole 202 remote to the communicating passage 203 is provided with a second port 206. The first insertion hole 201 is provided with a first airtight portion 207 and a second airtight portion 208. The first airtight portion 207 is disposed between the communicating passage 203 and the inlet hole 204. The second airtight portion 208 is disposed between the inlet hole 204 and the first port 205.

The switching assembly 30 includes a plunger 31 movably disposed in the first insertion hole 201 to alternately abut against the first airtight portion 207 or the second airtight portion 208 between a first position and a second position. The plunger 31 disengages from the second airtight portion 208 and abuts against the first airtight portion 207 to close an air path from the inlet hole 204 to the communicating passage 203 when the plunger 31 is in the first position. The plunger 31 disengages from the first airtight portion 207 and abuts against the second airtight portion 208 to close an air path from the inlet hole 204 to the first port 205 when the plunger 31 is in the second position.

The head 20 includes a housing 21, a sliding member 22, a first airtight ring 23, and a second airtight ring 24. The first port 205 and the second port 206 are located at the same end of the housing 21. The first insertion hole 201, the second insertion hole 202, and the communicating passage 203 are arranged on the sliding member 22. The sliding member 22 is movably disposed in the housing 21 between a released position and a tightened position. The first airtight ring 23 is disposed in the housing 21 and located between the sliding member 22 and the first port 205. The second airtight ring 24 is disposed in the housing 21 and located between the sliding member 22 and the second port 206. The sliding member 22 is away from the first port 205 and the second port 206 when the sliding member 22 is in the released position. The sliding member 22 approaches the first port 205 and the second port 206 to compress the first airtight ring 23 and the second airtight ring 24 to be deformed when the sliding member 22 is in the tightened position.

The head 20 further includes a pressing member 25. The first insertion hole 201 is arranged on the sliding member 22 and the pressing member 25. The first airtight portion 207 is arranged on the sliding member 22. The second airtight portion 208 is arranged on the pressing member 25. The pressing member 25 has a first side is abutted against the sliding member 22 and a second side abutting against the first airtight ring 23.

The head 20 further includes a lever 26 pivotally mounted on an end of the housing 21 remote to the first port 205 and the second port 206 between an unlock position and a locked position to selectively push against the sliding member 22. The sliding member 22 is moved to the released position when the lever 26 is in the unlock position. The lever 26 pushes the sliding member 22 to move to the tightened position when the lever 26 is in the lock position.

The head 20 further includes a pin 27 penetrably inserting the housing 21 and the lever 26, allowing the lever 26 rotatable relative to the housing 21 about the pin 27 between the unlock position and the lock position.

The plunger 31 includes a pushing rod 311, a first airtight member 312, and a second airtight member 313. The pushing rod 311 is movably disposed in the first insertion hole 201 along an axial direction of the first insertion hole 201. The first airtight member 312 and the second airtight member 313 are respectively sleeved on an outer periphery of the pushing rod 311. The first airtight member 312 abuts against the first airtight portion 207 and the second airtight member 313 disengages from the second airtight portion 208 when the plunger 31 is in the first position. The first airtight member 312 disengages from the first airtight portion 207 and the second airtight member 313 abuts against the second airtight portion 208 when the plunger 31 is in the second position.

The outer periphery of the pushing rod 311 is provided with a first narrow section 314, a second narrow section 315, and a wide section 316. The first narrow section 314 and the second narrow section 315 are respectively disposed at opposite ends of the pushing rod 311, the wide section 316 is disposed between the first narrow section 314 and the second narrow section 315. A width of the first narrow section 314 and a width of the second narrow section 315 are both smaller than a width of the wide section 316 in a radial direction of the first insertion hole 201. The first airtight member 312 is sleeved on the first narrow section 314 and abuts against the wide section 316. The second airtight member 313 is sleeved on the second narrow section 315 and abuts against the wide section 316.

The switching assembly 30 further includes a biasing member 32 disposed in the first insertion hole 201 and located a side of the pushing rod 311 remote the first port 205. The biasing member 32 has a first end abutting against the sliding member 22 and a second end abutting against the pushing rod 311 to bias the plunger 31 to the second position.

Figure 5:
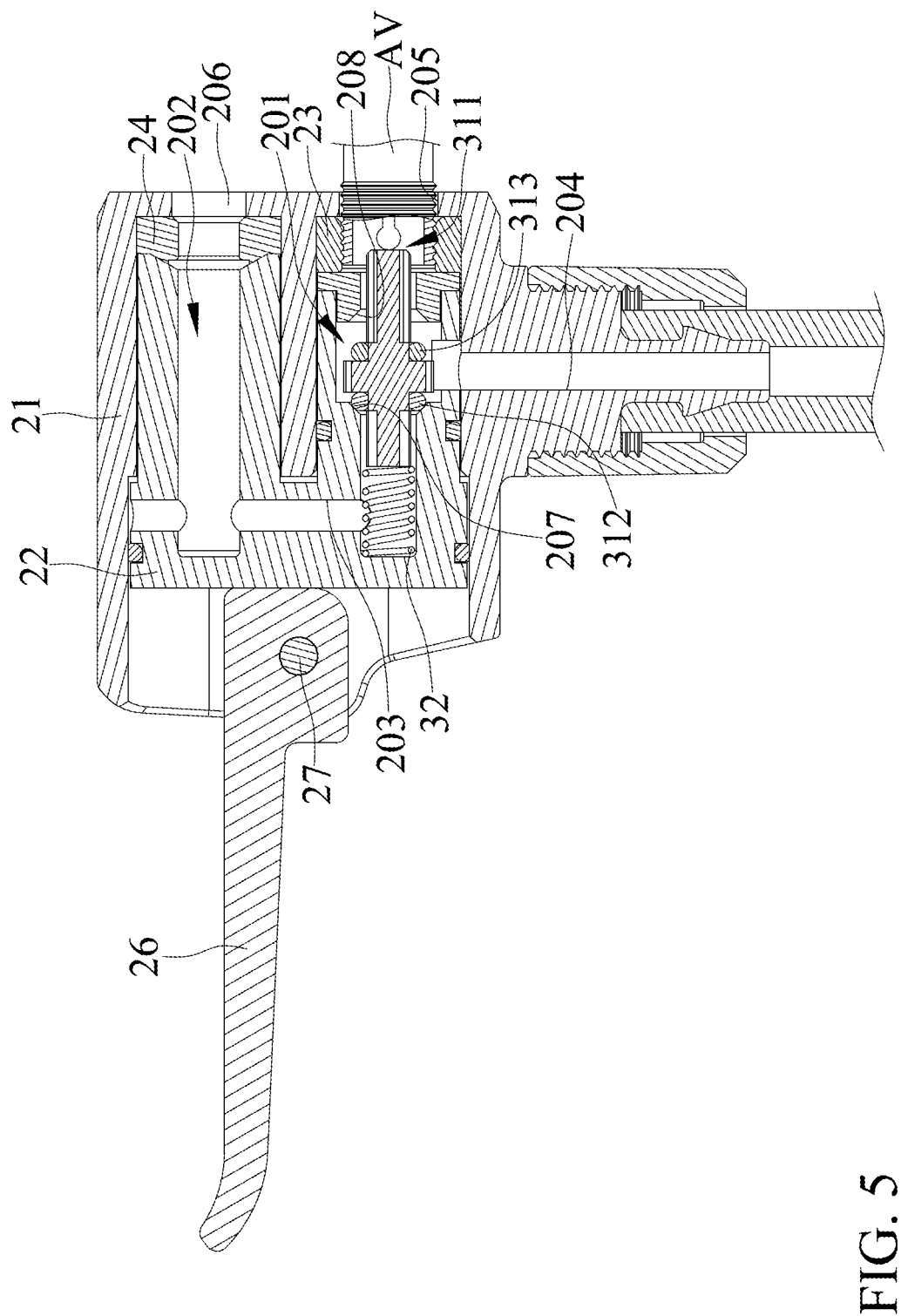
FIG. 5 is another cross sectional view of the air valve connector of FIG. 1 and shows the lever in a lock position and the first port connecting a Schrader valve.
Figure 6:
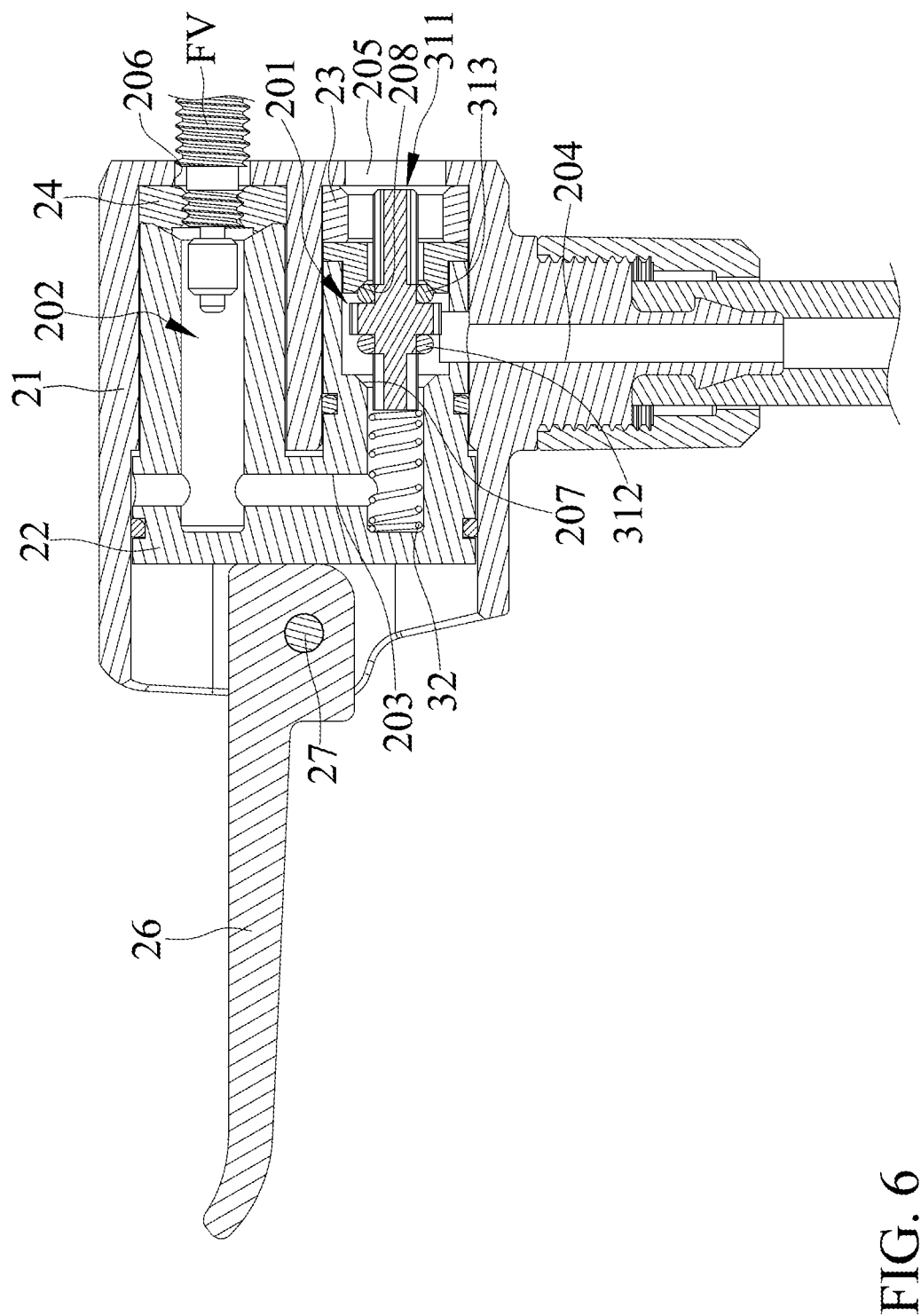
FIG. 6 is another cross sectional view of the air valve connector of FIG. 1 and shows the lever in a lock position and the second port connecting a Presta valve.

Therefore, the air valve connector 10, through the above structure, is suitable for a Schrader valve AV and a Presta valve FV. Alternatively, the Schrader valve AV can be inserted into the first insertion hole 201 via the first port 205, or the Presta valve FV can be inserted into the second insertion hole 202 via the second port 206. As shown in FIGS. 5 and 6, the lever 26 is rotated to the lock position to push the sliding member 22 to move to the tightened position, the compressed and deformed first airtight ring 23 and the second airtight ring 24 to hold the Schrader valve AV or Presta valve FV to form an airtight seal. As shown in FIG. 5, the Schrader valve AV can push the plunger 31 to move to the first position, and the airflow from the inlet hole 204 can pass through the second airtight portion 208 and be output through the first port 205. As shown in FIG. 6, the biasing member 32 can push the plunger 31 to move to the second position, and the airflow from the inlet hole 204 can pass through the first airtight portion 207 and be output through the second port 206.

Although specific embodiments have been illustrated and described, numerous modifications and variations are still possible without departing from the scope of the invention. The scope of the invention is limited by the accompanying claims.

The invention claimed is:

1. An air valve connector comprising:
a head having a first insertion hole, a second insertion hole, a communicating passage, and an inlet hole, wherein the communicating passage communicates with the first and second insertion holes, wherein the inlet hole communicates with the first insertion hole, wherein an end of the first insertion hole remote to the communicating passage is provided with a first port, wherein an end of the second insertion hole remote to the communicating passage is provided with a second port, wherein the first insertion hole is provided with a first airtight portion and a second airtight portion, wherein the first airtight portion is disposed between the communicating passage and the inlet hole, and wherein the second airtight portion is disposed between the inlet hole and the first port, wherein the head includes a housing, a sliding member, a first airtight ring, and a second airtight ring, wherein the first port and the second port are located at the same end of the housing, wherein the first insertion hole, the second insertion hole, and the communicating passage are arranged on the sliding member, wherein the sliding member is movably disposed in the housing between a released position and a tightened position, wherein the first airtight ring is disposed in the housing and located between the sliding member and the first port, wherein the second airtight ring is disposed in the housing and located between the sliding member and the second port, wherein the sliding member is away from the first port and the second port when the sliding member is in the released position, and wherein the sliding member approaches the first port and the second port to compress the first airtight ring and the second airtight ring to be deformed when the sliding member is in the tightened position;
a switching assembly including a plunger movably disposed in the first insertion hole to alternately abut against the first airtight portion or the second airtight portion between a first position and a second position, wherein the plunger disengages from the second airtight portion and abuts against the first airtight portion to close an air path from the inlet hole to the communicating passage when the plunger is in the first position, and wherein the plunger disengages from the first airtight portion and abuts against the second airtight portion to close an air path from the inlet hole to the first port when the plunger is in the second position.

2. The air valve connector as claimed in claim 1, wherein the head further includes a pressing member, wherein the first insertion hole is arranged on the sliding member and the pressing member, wherein the first airtight portion is arranged on the sliding member, wherein the second airtight portion is arranged on the pressing member, and wherein the pressing member has a first side is abutted against the sliding member and a second side abutting against the first airtight ring.

3. The air valve connector as claimed in claim 1, wherein the head further includes a lever pivotally mounted on an end of the housing remote to the first port and the second port between an unlock position and a locked position to selectively push against the sliding member, wherein the sliding member is moved to the released position when the lever is in the unlock position, and wherein the lever pushes the sliding member to move to the tightened position when the lever is in the lock position.

4. The air valve connector as claimed in claim 3, wherein the head further includes a pin penetrably inserting the housing and the lever, allowing the lever rotatable relative to the housing about the pin.

5. The air valve connector as claimed in claim 1, wherein the plunger includes a pushing rod, a first airtight member, and a second airtight member, wherein the pushing rod is movably disposed in the first insertion hole along an axial direction of the first insertion hole, wherein the first airtight member and the second airtight member are respectively sleeved on an outer periphery of the pushing rod, wherein the first airtight member abuts against the first airtight portion and the second airtight member disengages from the second airtight portion when the plunger is in the first position, and wherein the first airtight member disengages from the first airtight portion and the second airtight member abuts against the second airtight portion when the plunger is in the second position.

6. An air valve connector comprising:
a head having a first insertion hole, a second insertion hole, a communicating passage, and an inlet hole, wherein the communicating passage communicates with the first and second insertion holes, wherein the inlet hole communicates with the first insertion hole, wherein an end of the first insertion hole remote to the communicating passage is provided with a first port, wherein an end of the second insertion hole remote to the communicating passage is provided with a second port, wherein the first insertion hole is provided with a first airtight portion and a second airtight portion, wherein the first airtight portion is disposed between the communicating passage and the inlet hole, and wherein the second airtight portion is disposed between the inlet hole and the first port; and
a switching assembly including a plunger movably disposed in the first insertion hole to alternately abut against the first airtight portion or the second airtight portion between a first position and a second position, wherein the plunger disengages from the second airtight portion and abuts against the first airtight portion to close an air path from the inlet hole to the communicating passage when the plunger is in the first position, wherein the plunger disengages from the first airtight portion and abuts against the second airtight portion to close an air path from the inlet hole to the first port when the plunger is in the second position, wherein the plunger includes a pushing rod, a first airtight member, and a second airtight member, wherein the outer periphery of the pushing rod is provided with a first narrow section, a second narrow section, and a wide section, wherein the first narrow section and the second narrow section are respectively disposed at opposite ends of the pushing rod, the wide section is disposed between the first narrow section and the second narrow section, wherein a width of the first narrow section and a width of the second narrow section are both smaller than a width of the wide section in a radial direction of the first insertion hole, wherein the first airtight member is sleeved on the first narrow section and abuts against the wide section, and wherein the second airtight member is sleeved on the second narrow section and abuts against the wide section.

7. The air valve connector as claimed in claim 6, wherein the switching assembly further includes a biasing member disposed in the first insertion hole and located a side of the pushing rod remote the first port, and wherein the biasing member has a first end abutting against the sliding member and a second end abutting against the pushing rod to bias the plunger to the second position.

\* \* \* \* \*